US010355594B2

(12) United States Patent
Nakashima et al.

(10) Patent No.: US 10,355,594 B2
(45) Date of Patent: Jul. 16, 2019

(54) DC-DC CONVERTER AND LOAD-DRIVING SEMICONDUCTOR INTEGRATED CIRCUIT

(71) Applicants: Heisuke Nakashima, Tama (JP); Kenji Mitsuhira, Tama (JP); Fumihiro Inoue, Tama (JP)

(72) Inventors: Heisuke Nakashima, Tama (JP); Kenji Mitsuhira, Tama (JP); Fumihiro Inoue, Tama (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/065,784

(22) PCT Filed: Oct. 24, 2016

(86) PCT No.: PCT/JP2016/081385
§ 371 (c)(1),
(2) Date: Jun. 22, 2018

(87) PCT Pub. No.: WO2017/110231
PCT Pub. Date: Jun. 29, 2017

(65) Prior Publication Data
US 2019/0013734 A1   Jan. 10, 2019

(30) Foreign Application Priority Data

Dec. 24, 2015 (JP) .................. 2015-251636

(51) Int. Cl.
*H02M 3/156* (2006.01)
*H02M 3/158* (2006.01)
(Continued)

(52) U.S. Cl.
CPC .............. *H02M 3/158* (2013.01); *H02M 1/08* (2013.01); *H02M 3/155* (2013.01); *H02M 3/156* (2013.01); *H02M 2001/0009* (2013.01)

(58) Field of Classification Search
CPC ................. H02M 3/156; H02M 3/157; H02M 2001/0009
(Continued)

(56) References Cited

U.S. PATENT DOCUMENTS 8,379,420 B2 * 2/2013 Orr ..................... H02M 1/4208
323/222
9,948,181 B2 * 4/2018 Manohar ............... H02M 3/158
(Continued)

FOREIGN PATENT DOCUMENTS

JP      H08298768 A    11/1996
JP      2007181389 A    7/2007
(Continued)

OTHER PUBLICATIONS

International Preliminary Report on Patentability (IPRP) (and English langauage translation thereof) dated Jun. 26, 2018 issued in International Application No. PCT/JP2016/081385.
(Continued)

*Primary Examiner* — Alex Torres-Rivera
(74) *Attorney, Agent, or Firm* — Holtz, Holtz & Volek PC

(57) ABSTRACT

A DC-DC converter, which allows a current to pass through an inductor and rectifies the current through the inductor to convert an input direct current voltage supplied from a direct current power unit into a direct current voltage at a different potential and output the direct current voltage, includes a switching control circuit performing peak-current control procedures including turning on the switching element when the converted direct current voltage drops to a predetermined potential and turning off the switching element when the current through the inductor reaches a predetermined value. The converter includes a copied-current generating circuit generating a current proportional to the output current. The switching control circuit turns off the switching
(Continued)

element when the circuit detects that the current through the inductor reaches a predetermined value with reference to a combined current of the copied current generated at the copied-current generating circuit and a predetermined reference current.

10 Claims, 6 Drawing Sheets

(51) Int. Cl.
*H02M 3/155* (2006.01)
*H02M 1/08* (2006.01)
*H02M 1/00* (2006.01)

(58) Field of Classification Search
USPC ............... 323/207, 222, 282, 283, 284, 285
See application file for complete search history.

(56) References Cited

U.S. PATENT DOCUMENTS

| | | | | |
|---|---|---|---|---|
| 2006/0043942 A1* | 3/2006 | Cohen | .................. | H02M 3/156 323/207 |
| 2007/0145957 A1 | 6/2007 | Wu et al. | | |
| 2008/0111530 A1 | 5/2008 | Hasegawa et al. | | |
| 2014/0117964 A1* | 5/2014 | Walters | .............. | H05B 33/0815 323/299 |
| 2014/0327421 A1 | 11/2014 | Arao | | |
| 2014/0354250 A1* | 12/2014 | Deng | .................. | H02M 3/1582 323/271 |
| 2015/0098016 A1* | 4/2015 | Otsuka | ............... | H04N 5/23241 348/372 |
| 2017/0040892 A1* | 2/2017 | Rutkowski | ............ | H02M 3/158 |

FOREIGN PATENT DOCUMENTS

| | | |
|---|---|---|
| JP | 2008125220 A | 5/2008 |
| JP | 2014233196 A | 12/2014 |

OTHER PUBLICATIONS

International Search Report (ISR) dated Nov. 22, 2016 issued in International Application No. PCT/JP2016/081385.
Written Opinion dated Nov. 22, 2016 issued in International Application No. PCT/JP2016/081385.

* cited by examiner

DC-DC CONVERTER AND LOAD-DRIVING SEMICONDUCTOR INTEGRATED CIRCUIT

TECHNICAL FIELD

The present invention relates to a switching regulator type of DC-DC converter and a load-driving semiconductor integrated circuit (load-driving IC) for conversion of direct current voltage. For example, the present invention relates to an effective technique in control of a switching frequency in, for example, a boosting DC-DC converter such that the frequency is not in frequency bands of signals in broadcasts, such as radio broadcasts, and human audible ranges.

BACKGROUND

Circuits for conversion of an input direct current voltage to an output direct current voltage at a different potential include a switching regulator type of DC-DC converter. This DC-DC converter includes a switching element that applies a direct current voltage from a direct current power supply to an inductor (coil) to allow a current to pass through and store energy in the inductor, a rectifier circuit that rectifies the current in the inductor in an energy emission period when the switching element is off, and a control circuit that turns on or off the switching element. The switching regulator type of DC-DC converter performs the following control: an error amplifier detects the level of an output voltage and feeds back the results to a pulse-width modulation (PWM) comparator; and the turn-on time of the switching element is extended in response to a drop in the output voltage whereas the turn-on time is shortened in response to a rise in the output voltage.

Some electronic devices, such as displays for automobiles, have recently used, for example, piezoelectric elements as actuators controlling the attitudes of components. Such a piezoelectric element has a capacitive load and is driven at a relatively high voltage. Thus, a differential amplifier may be used as a load-driving circuit for the piezoelectric element, and a switching regulator type of DC-DC converter having a high boosting rate may be used as a power supply for supplying a power voltage for the amplifier. Since batteries for automobiles have relatively large variations in voltage, it is expected to use a peak-current control scheme (current limit PFM scheme) for DC-DC converters or power supplies that generate power voltages for automobile electronic devices, where the peak current is kept constant regardless of the level of the voltage to be boosted.

PRIOR ART DOCUMENT

Patent Document

Patent Document 1: JP 2014-233196 A
Patent Document 2: JP H08-298768 A

SUMMARY

Problems to be Solved by the Invention

In a peak-current control type of DC-DC converter, the switching frequency fluctuates in response to a variation in a load current. In detail, as illustrated in FIG. 3B, the frequency is high at a high load whereas the frequency is low at a low load. Meanwhile, automobile electronic devices include an audio device that receives radio broadcasts. If the operating frequency of the DC-DC converter varies into the range of 500 kHz to 1.7 MHz or a frequency band of, for example, an AM radio broadcast, a speaker makes noise. If the operating frequency of the DC-DC converter varies into the range of 20 Hz to 20 kHz or the human audible range, a power supply may generate uncomfortable noises like inductor sounds.

In order to avoid such noises, a possible solution to operate the DC-DC converter at a frequency above the radio broadcast frequency band, i.e., above 1.7 MHz. However, the DC-DC converter having a high boosting rate and a large load capacity cannot be readily operated at such a high switching frequency and thus has no prospect of actual use.

For example, Patent Literature 1 discloses an invention related to a switching regulator configured to vary the switching frequency in response to a variation of load current. Patent Literature 2 discloses an invention related to a DC-DC converter according to a frequency control scheme that varies the pulse width in response to a variation in output voltage and controls the output voltage.

However, both the inventions aim at reducing the ripples of the output voltage to a low level whereas enhancing the efficiency in conversion of the input direct current voltage. The control is based on the variation in the duty cycle and the pulse width of switching-control signals, not on the variation in the peak current passing through the inductor in response to the level of the load current to vary the frequency.

If no measure is taken against the DC-DC converter according to the frequency control scheme to vary the switching frequency in response to a fluctuation in the load current, on-off operations are continuously repeated at a high frequency until the output voltage reaches a predetermined value at the time of startup, as shown in FIG. 4B. Thus, a boosted power supply is required for a high current load, and a large scale of power supply having a high power supply capacity is required.

Traditional solutions for the problem at the time of startup as described above include, for example, a drop of the peak current at the time of startup and the extension of the turn-off time.

An object of the present invention, which has been made in view of the above described background, is to provide a DC-DC converter and a load-driving semiconductor integrated circuit that can vary the peak current passing through an inductor in response to the level of the load current to reduce a variation in operating frequency, thereby controls the operating frequency outside of the human audible range and the frequency band of radio-wave broadcasting, for example, radio broadcasting. Noise generation is thereby hindered.

Another object of the invention is to provide a DC-DC converter and a load-driving semiconductor integrated circuit that can reduce the power at the time of startup without an increase in circuit scale and do not require a large scale of power supply having a high power supply capacity.

Means for Solving Problems

In order to solve the above problem, according to the present invention, there is provided a DC-DC converter that turns on or off a switching element which allows a current to pass through an inductor and rectifies the current through the inductor to convert an input direct current voltage supplied from a direct current power unit into a direct current voltage at a different potential and output the direct current voltage, the converter including:

a switching control circuit performing peak-current control procedures including turning on the switching element when the converted direct current voltage drops to a predetermined potential and turning off the switching element when the current through the inductor reaches a predetermined value; and a copied-current generating circuit generating a copied current proportional to the output current, wherein the switching control circuit turns off the switching element when the switching control circuit detects that the current through the inductor reaches a predetermined value with reference to a combined current of the copied current generated at the copied-current generating circuit and a predetermined reference current.

In accordance with the configuration above, the peak current through the inductor can be varied according to the level of the output current. This can reduce the fluctuation in the operating frequency, control the operating frequency outside of the human audible range and the frequency band of radio-wave broadcasting, for example, radio broadcasting, and prevent noise generation.

Another possible approach is to provide a sensing resistor at an output for directly detecting the output current and shifting the peak current. Instead, as described above, generation of a copied current proportional to the current from the DC-DC converter and detection of the level of the output current for control of the peak current can prevent the power loss in a sensing resistor receiving a high current and enhance the power efficiency.

A further approach is detection of a variation in output voltage due to the fluctuation in load to vary the peak current. Instead, as described above, generation of the copied current proportional to the current from the DC-DC converter and detection of the level of the output current for control of the peak current can enhance the load transient response characteristics.

Preferably, the DC-DC converter further includes a load-driving circuit for receiving the converted direct current voltage and outputting the current to a load, and the copied-current generating circuit generates a copied current proportional to the current output from the load-driving circuit.

The DC-DC converter including a load-driving circuit can vary the peak current through the inductor depending on the level of the load current, and thus can reduce the fluctuation in the operating frequency and control the operating frequency outside of the human audible range and the frequency band of radio-wave broadcasting, for example, radio broadcasting.

Preferably, the load-driving circuit comprises a differential amplifier amplifying an input signal and an output circuit generating and outputting a current corresponding to the amplified output signal from the differential amplifier, and the copied-current generating circuit generates a copied current proportional to the current from the output circuit.

The DC-DC converter including a load-driving circuit for driving of a load in response to an input signal can decrease the fluctuation in the operating frequency and thus can control the operating frequency outside of the human audible range and the frequency band of radio-wave broadcasting, for example, radio broadcasting.

Preferably, the load-driving circuit includes differential amplifiers amplifying input signals and output circuits generating and outputting currents in response to output signals from the differential amplifiers, the copied-current generating circuit generates a copied current proportional to a combined current of currents from the output circuits and supplies the copied current to the switching control circuit, and the switching control circuit turns off the switching element when the switching control circuit detects that the current through the inductor reaches a predetermined value with reference to a combined current of the resultant copied-current from the copied-current generating circuit and a predetermined reference current.

The DC-DC converter including a load-driving circuit capable of outputting load currents can decrease the fluctuation in the operating frequency, and thus can control the operating frequency outside of the human audible range and the frequency band of radio-wave broadcasting, for example, radio broadcasting.

Preferably, the copied-current generating circuit is configured to generate a copied current proportional to a current generated by combination of currents fed from the output circuits with the operating currents of the differential amplifiers.

This configuration can more precisely copy the load current, reduce the fluctuation in the operating frequency, and thus control the operating frequency outside of the human audible range and the frequency band of radio-wave broadcasting, for example, radio broadcasting, even if the currents from the output circuits are low.

Preferably, the switching element is a field effect transistor, the switching control circuit comprises a current detection circuit, and the current detection circuit comprises a conductive field effect transistor having the same conductivity type as that of the switching element, the combined current of the copied current generated at the copied-current generating circuit and the reference current passing through the field effect transistor; compares a reference voltage converted from the current at the field effect transistor with a drain voltage of the switching element; and generates a signal that provides timing for turning off the switching element when the drain voltage reaches the reference voltage.

The reference voltage can be readily determined that corresponds to the value of the peak current providing timing for turning off the switching element. The reference voltage allows detection of appropriate timing for turning off the switching element.

Preferably, the DC-DC converter further includes a transmission switch capable of delivering or blocking the drain voltage of the switching element to the current detection circuit, the transmission switch being switched on or off in response to switching on or off of the switching element.

While the switching element is in an OFF state, erroneous application of a high voltage to the current detection circuit can be prevented.

Preferably, the switching control circuit further comprises a divider circuit dividing an output voltage to generate a feedback voltage and a circuit generating a signal to provide timing for turning on the switching element when the feedback voltage reaches a predetermined potential, the divider circuit is capable of varying a voltage division ratio and determines the output voltage in response to the voltage division ratio of the divider circuit, the current detection circuit comprises field effect transistors provided in series, the field effect transistors having the same conductivity type as that of the switching element, and a combined current of the copied current and the reference current passing through the field effect transistors, the field effect transistors selectively operate in response to the voltage division ratio of the divider circuit such that the drain voltage of the switching element varies when the switching element is switched off.

The DC-DC converter capable of changing the output voltage can determine a reference voltage corresponding to the peak current providing timing for turning off the switching element in response to a determined output voltage and detect appropriate timing for turning off the switching element using the reference voltage.

Preferably, the load-driving circuit includes a differential amplifier amplifying an input signal and an output circuit generating and outputting a current corresponding to an output from the differential amplifier, the output circuit includes a first transistor outputting a current corresponding to the signal from the differential amplifier, and the copied-current generating circuit is a current mirror circuit comprising a second transistor provided in parallel to the first transistor, the same signal being applied to control terminals of the first and second transistors such that a current proportional to the signal passes through the second transistor, the current passing through the second transistor being supplied to the current detection circuit as the copied current.

The copied-current generating circuit including a current mirror circuit can readily generate a copied current proportional to the output current.

Preferably, the output circuit comprises a third transistor connected in series to the first transistor between a power voltage terminal and a grounding point, the connection node of the first transistor and the third transistor being connected to the output terminal of a load, the current mirror circuit is of a cascode type comprising:
  a fourth transistor and a constant-current source provided in series between the connection node and the grounding point; and
  a fifth transistor connected in series to the second transistor, the same signal being applied to the control terminals of the fourth and fifth transistors, the fourth transistor being connected to a diode.

The current mirror circuit in the copied-current generating circuit is of a cascode type. A copied current proportional to the output current can be generated without impact of the channel-length modulation effect. A transistor in a cascode stage is provided not in series but in parallel to a transistor (third transistor) in the output circuit, which can keep the range of the output voltage.

Preferably, the DC-DC converter further includes a second transmission switch that supplies the copied current generated at the copied-current generating circuit to the current detection circuit or blocks the copied current, the second transmission switch being switched off at the time of startup and being switched on in a normal operation after the startup.

The supply of the copied current from the copied-current generating circuit to the current detection circuit can be stopped at the time of startup. The value of the peak current at the time of startup can be thereby fixed to a minimum value in the normal operation. The power consumption at the time of startup can be reduced without an increase in scale of the circuit (the scale of a power supply at the input).

According to another invention of the present application, there is provided a load-driving semiconductor integrated circuit including a switching control circuit and a load-driving circuit on a single semiconductor substrate, the switching control circuit turning on or off a switching element which allows a current to pass through an inductor and rectify the current through the inductor to convert an input direct current voltage supplied from a direct current power unit into a direct current voltage at a different potential and output the direct current voltage, and the load-driving circuit outputting a current to a load, wherein the load-driving circuit includes a copied-current generating circuit for generating a copied current proportional to the output current, the load-driving circuit receiving the converted direct current voltage outputting a current to the load, and supplying the copied current to the switching control circuit, the switching control circuit being configured to:
perform peak-current control procedures including turning on the switching element and then turning off the switching element when the current through the inductor reaches a predetermined value, turn off the switching element when the switching control circuit detects that the current through the inductor reaches a predetermined value with reference to a combined current of the copied current generated at the copied-current generating circuit and a predetermined reference current, and turn on the switching element when the converted direct current voltage drops to a predetermined potential.

In accordance with this configuration, the load-driving semiconductor integrated circuit including a power supply (DC-DC converter) can vary the peak current passing through the inductor in response to the level of a load current and thereby reduce the fluctuation in the operating frequency. The operating frequency outside of the human audible range and the frequency band of radio-wave broadcasting, for example, radio broadcasting can be controlled. Noise generation can also be prevented.

Advantageous Effects of Invention

The present invention can achieve a DC-DC converter and a load-driving semiconductor integrated circuit that can control the operating frequency outside of the human audible range and the frequency band of radio-wave broadcasting, for example, radio broadcasting and can prevent noise generation. The invention can also achieve a DC-DC converter and a load-driving semiconductor integrated circuit that can reduce power at the time of startup without an increase in circuit scale and do not require a large scale of a power supply capacity.

EMBODIMENTS FOR CARRYING OUT THE INVENTION

Preferred embodiments according to the present invention will now be described in reference to the appended drawings.

Figure 1:
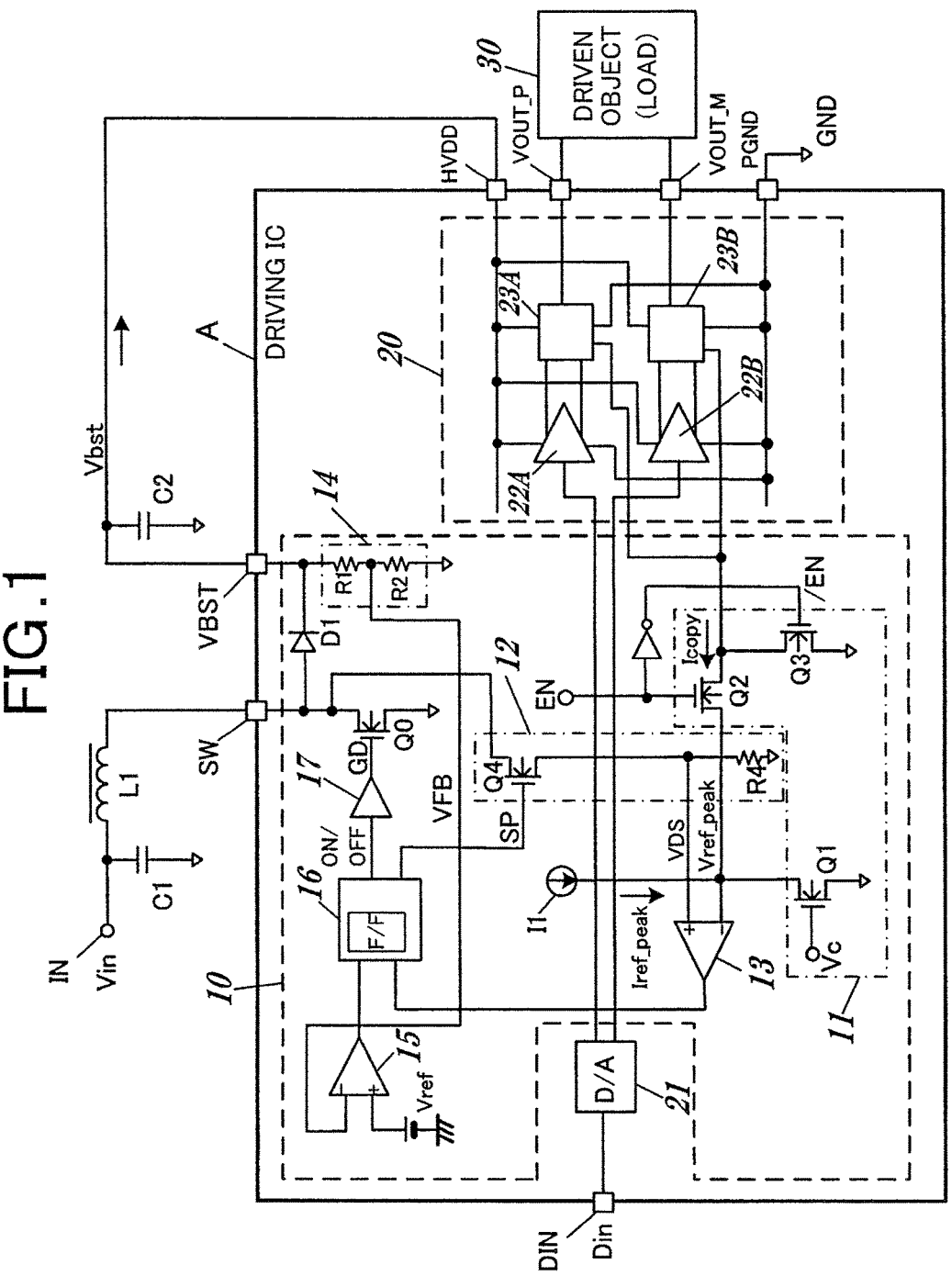
FIG. 1 is a diagram illustrating a DC-DC converter and a load-driving semiconductor integrated circuit according to an embodiment of the present invention.

FIG. 1 illustrates one embodiment of a load-driving circuit that includes a DC-DC converter (a power supply) according to the present invention and is suitable for driving of a capacitive load, such as a piezoelectric device, requiring a relatively high driving voltage. The device of the circuit surrounded by solid lines A in FIG. 1 is disposed on one semiconductor chip, which functions as a semiconductor integrated circuit (IC), although such a configuration is not restrictive.

In this embodiment, the DC-DC converter as a direct current power source includes:

an inductor (coil) L1 having a first terminal connected to a voltage inputting terminal IN to which an input direct current voltage Vin is applied;

a switching transistor Q0 as a switching element including a N-channel MOSFET (field effect transistor) that is disposed between a second terminal of the inductor L1 and a grounding point and allows currents to pass through the inductor L1 to drive it; a rectifier diode D1 disposed between the second terminal of the inductor L1 and a terminal VBST;

a switching control circuit section 10 for turning on or off the switching transistor Q0; a capacitor C1 disposed between the voltage inputting terminal IN and the grounding point; and a capacitor C2 disposed between the terminal VBST and the grounding point.

The switching transistor Q0 is a large-size MOS transistor (a power MOSFET) to allow a high current to pass through the inductor L1.

In the embodiment, the inductor L1 and the capacitors C1 and C2 are discrete components. The switching control circuit section 10, the switching transistor Q0, the rectifier diode D1, and a load-driving circuit section 20 generating and outputting signals (voltages and currents) for driving of a load are integrated into one semiconductor chip, which functions as a self-powered load-driving semiconductor integrated circuit (hereinafter referred to as a load-driving IC). The load-driving IC is connected to the inductor L1 and the capacitors C1 and C2 as external elements. It should be noted that the switching transistor Q0 and the rectifier diode D1 may also be discrete components.

The load-driving IC is provided with external terminals, i.e., a terminal SW connected to the first terminal of the inductor L1, a terminal VBST connected to the capacitor C2, a terminal HVDD that supplies a voltage from the terminal VBST to the load-driving circuit section 20, a terminal PGND providing grounding potential to the load-driving circuit section 20, a data inputting terminal DIN receiving a digital signal Din to be eventually output from the load-driving circuit section 20, and a pair of outputting terminals VOUT_P and VOUT_M outputting the driving signal generated at the load-driving circuit section 20. These outputting terminals VOUT_P and VOUT_M are connected to a load 30, such as an actuator, to be driven.

The load-driving circuit section 20 includes:

a digital-analog conversion circuit 21 converting the digital signals Din from the outside into analog signals;

a differential amplifiers 22A and 22B receiving the analog signals from the digital-analog conversion circuit 21; and output circuit sections 23A and 23B having an output-current copying function that generates a current in response to a differential signal from the differential amplifiers 22A and 22B, outputs the currents through the outputting terminals VOUT_P and VOUT_M, generates a current Icopy proportionally reduced from the output current, and supplies the current to the switching control circuit section 10.

Thus, in the embodiment, the output currents fed from the output circuit sections 23A and 23B to the load, the copied current Icopy supplied to the switching control circuit section 10, and the consumption currents of the differential amplifiers 22A and 22B serve as load currents for the DC-DC converter including the inductor L1, the switching transistor Q0, and the switching control circuit section 10.

The differential amplifiers 22A and 22B output signals having reversed phases to each other. In other words, the output circuit section 23B receives a signal having a reversed phase to the signal from the differential amplifier 22A to the output circuit section 23A. The output circuit sections 23A and 23B reversely operate; when one of them feeds discharge currents, the other draws the currents.

The switching control circuit section 10 includes:

a constant-current source I1 that generates a reference current Iref_peak;

a reference-voltage generating circuit 11 that combines the reference current Iref_peak from the constant-current source I1 with the copied current Icopy supplied from the load-driving circuit section 20 and converts the combined current into a reference voltage Vref_peak for detection of the current peak;

a current detection circuit 12 that detects the level of a current passing through the inductor L1; and a first comparator 13 that compares the output voltage from the current detection circuit 12 with the reference voltage Vref_peak generated at the reference-voltage generating circuit 11 and detects the timing for turning off the switching transistor Q0.

The switching control circuit section 10 also includes:

a divider circuit 14 including series resistors R1 and R2 disposed between the terminal VBST and the grounding point and generating a feedback voltage V FB proportional to an output voltage;

a second comparator 15 comparing the feedback voltage V FB with the reference voltage Vref at a predetermined potential and detecting the timing for turning on the switching transistor Q0;

a logic circuit 16 receiving signals from the first and second comparators 13 and 15 and including a RS flip-flop F/F for generation of on-off control signals ON/OFF to turn on or off the switching transistor Q0; and a gate driver 17 driving a gate terminal of the switching transistor Q0 in response to the generated on-off control signals ON/OFF and turning on or off the switching transistor Q0.

The reference-voltage generating circuit 11 includes:

a N-channel MOS transistor Q1 receiving a current generated by combination of the reference current Iref_peak from the constant-current source I1 with the copied current Icopy supplied from the load-driving circuit section 20;

a transmission MOS transistor Q2 switching the copied current Icopy from the load-driving circuit section 20 to the MOS transistor Q1; and a MOS transistor Q3 switched on or off complementary to the transistor Q2 and transmitting the copied current Icopy to the grounding point if the transistor Q2 is blocked.

The MOS transistor Q1 has a gate terminal receiving an applied voltage having the same level as that of a gate voltage of the transistor Q0 and converts its drain current into a voltage, which is then fed to an inverted input terminal of the first comparator 13.

The current detection circuit 12 includes a N-channel MOS transistor Q4 and a resistor R4 connected in series between the grounding point and a drain terminal (external terminal SW) of the switching transistor Q0, which supplies currents to the inductor L1. The MOS transistor Q4 switched on causes a drain voltage of the switching transistor Q0 to be input to a non-inverted input terminal of the first comparator 13. The output from the first comparator 13 provides the timing for turning off the switching transistor Q0.

The MOS transistor Q4 receives sampling pulses SP through its gate terminal. The sampling pulses SP, which are kept in a high level only in the period of detection of the peak current passing through the inductor L1, turn on the transistor Q4. The sampling pulses SP may be signals, for example, generated in response to the control signals ON/OFF turning on or off the switching transistor Q0 and providing a similar timing to that of the control signals. This can prevent a high voltage from being erroneously applied to the non-inverted input terminal of the first comparator 13 while the switching transistor Q0 is in an OFF state. It should be noted that the logic circuit 16 may be provided with a circuit that generates the sampling pulses SP for turning on of the MOS transistor Q4.

The MOS transistor Q4 is designed to have sufficiently low ON resistance when it is in an ON state. Thus, when the transistor Q4 is switched on, a drain voltage VDS proportional to the drain current of the switching transistor Q0 (i.e., the current of the inductor) is transmitted to the non-inverted input terminal of the first comparator 13 and is compared with the reference voltage Vref_peak. If the drain voltage VDS is higher than the reference voltage Vref_peak, the output signal from the first comparator 13 is inverted and the RS flip-flop F/F in the logic circuit 16 is reset. The switching transistor Q0 is thereby switched off. Hence, at VDS=Vref_peak, the drain current of the transistor Q0 is the peak current flowing through the inductor L1. The resistor R4 connected in series to the MOS transistor Q4 fixes the voltage fed to the first comparator 13 at the grounding potential in the period of the transistor Q4 being off and is designed to have a resistance value of, for example, 100 kΩ.

In the reference-voltage generating circuit 11, the transistor Q1, which transmits the combined current of the reference current Iref_peak and the copied current Icopy from the output circuit section, is of the N-channel type identical to the switching transistor Q0 feeding currents to the inductor L1. This offsets the temperature characteristics of the transistors Q0 and Q1 and enables currents insusceptible to a temperature variation to be detected.

The transistor Q1 has a size smaller than that of the transistor Q0. Let the gate width of the transistor Q0 be W0 and that of the transistor Q1 be W1. The transistor Q1 is designed such that the current value Ipeak of the switching transistor Q0 satisfies the relation: Ipeak: (Icopy+Iref_peak) =W0:W1 when a current passes through the transistor Q0 and the VDS rises to the voltage Vref_peak. It should be noted that Icopy corresponds to the sum (Icopy_P+ Icopy_M) of a copied current Icopy_P from the output circuit section 23A and a copied current Icopy_M from the output circuit section 23B. As will be described below in detail, Icopy_P is proportional to an output current Iout_P from the output circuit section 23A whereas Icopy_M is proportional to an output current Iout_M from the output circuit section 23B.

As described above, in the present embodiment, the reference voltage Vref_peak is generated in response to the combined current of the copied current Icopy proportional to the output currents from the output circuit sections 23A and 23B in the load-driving circuit section 20 and the reference current Iref_peak; and then the reference voltage Vref_peak is compared with the drain voltage VDS of the switching transistor Q0 in the first comparator 13 to determine the timing for switching off the transistor Q0. The peak current Ipeak through the inductor L1 can be varied in response to the level of the output current from the load-driving circuit section 20.

Figure 3A:
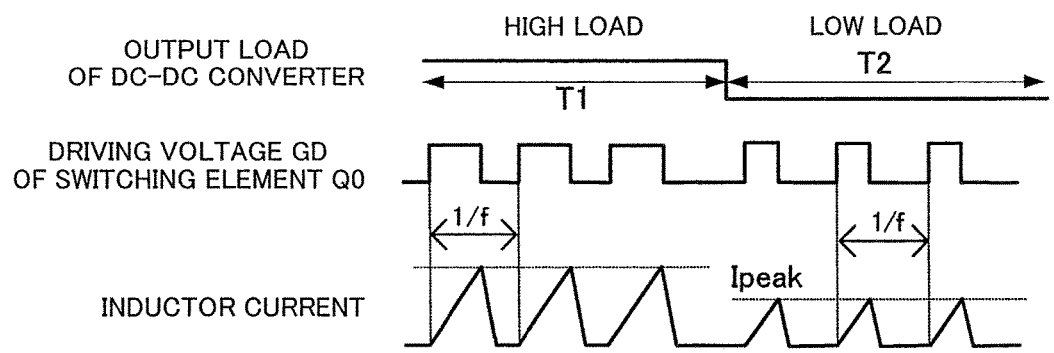
FIG. 3A is a timing chart indicating the relations between a variation in load of the DC-DC converter and variations in driving voltage and inductor current of a switching element during the normal operation according to the embodiment of the present invention.
Figure 3B:
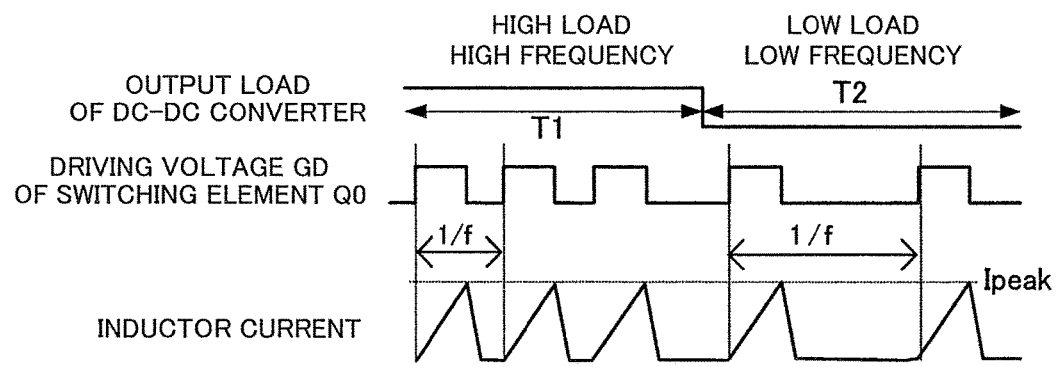
FIG. 3B is a timing chart indicating the relations between a variation in load and variations in driving voltage and inductor current of a switching element during the normal operation of a traditional DC-DC converter.

Thus, as illustrated in FIG. 3A, the peak current Ipeak is high and the gate-driving signal GD of the switching transistor Q0 has a large pulse width in the period T1 of a high load and a high output current from the load-driving circuit section 20. In contrast, the peak current Ipeak is low and the gate-driving signal GD of the switching transistor Q0 has a small pulse width in the period T2 of a low load and a low output current from the load-driving circuit section 20. As a result, the switching frequency f and the switching cycle 1/f can be kept constant regardless of the level of the load (level of the output current).

Figure 5A:
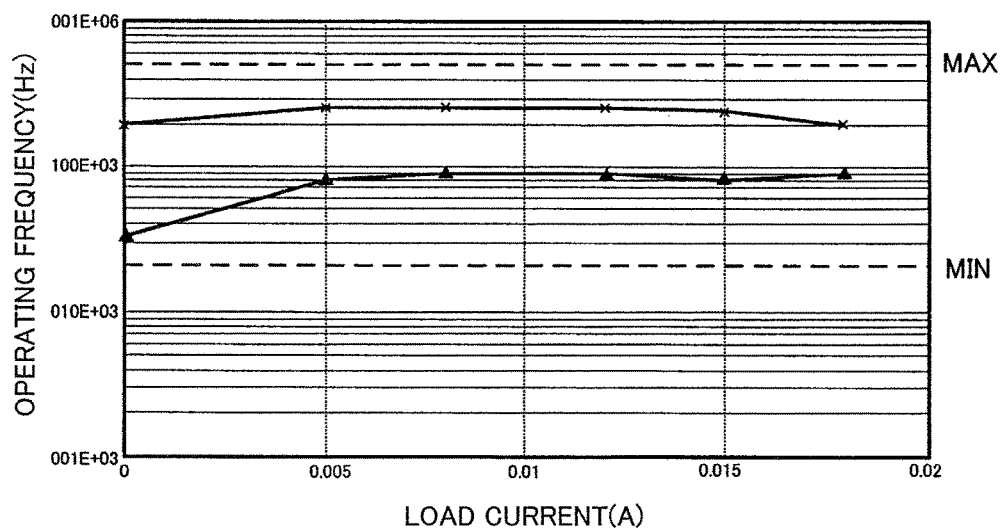
FIG. 5A is a characteristics chart indicating the relations between the load current and the operating frequency of the DC-DC converter according to the embodiment.
Figure 5B:
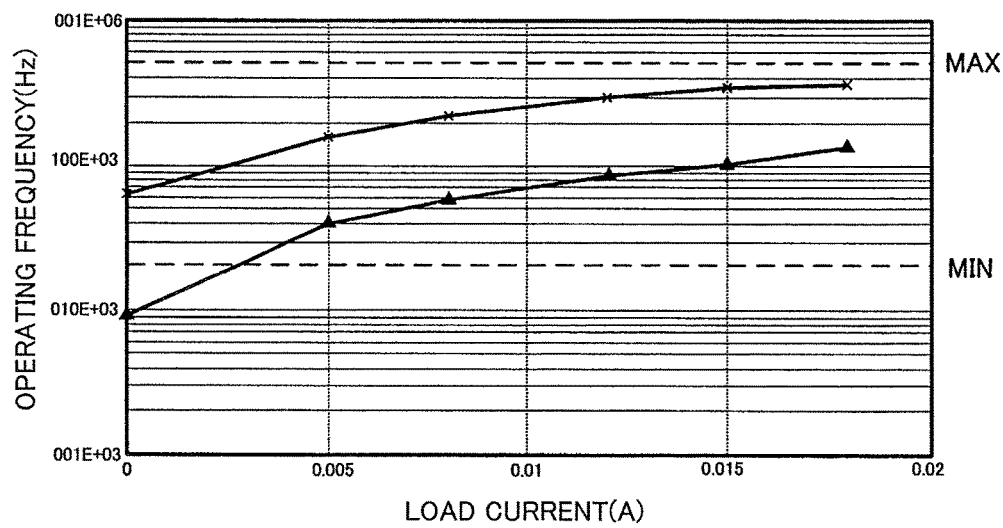
FIG. 5B is a characteristics chart indicating the relations between the load current and the operating frequency of the traditional DC-DC converter.

FIG. 5A shows the simulative results on a variation in the operating frequency of the DC-DC converter relative to a variation in load in this embodiment. FIG. 5B shows simulative results on a variation in the operating frequency of the DC-DC converter relative to a variation in load in the case where the copied current Icopy from the load-driving circuit section 20 is not combined with the reference current Iref_peak and the reference voltage Vref_peak or the peak current Ipeak is fixed for comparison. In FIGS. 5A and 5B, parameters, such as the inductance of the inductor L1 and the input direct current voltage yin, are varied. The mark x plots maximum values of the operating frequency whereas the mark ▲ plots minimum values of the operating frequency. MAX denotes the upper limit of the allowable ranges of the operating frequency (500 kHz), and MIN denotes the lower limit of the allowable ranges of the operating frequency (20 kHz).

It is apparent from FIG. 5B that the operating frequency significantly varies in response to the level of the load at the fixed reference voltage Vref_peak, and that the operating frequency cannot be kept in the target frequency range between the upper limit frequency of 20 kHz in the audible ranges and the lower limit frequency of 500 kHz in the radio broadcast frequency bands. On the contrary, as illustrated in FIG. 5A, this embodiment can keep the operating frequency f substantially constant regardless of the level of the load. It is apparent that the operating frequency can be readily maintained within the target voltage range.

The DC-DC converter according to this embodiment controls the peak-current in response to the output current, while the switching transistor Q0 is being repeatedly switched on or off at the time of startup of the converter until the output voltage reaches a predetermined value. Thus, the boosted power supply has a high current load.

The load-driving IC included in the DC-DC converter according to this embodiment is accordingly configured to temporarily turn off the transmission MOS transistor Q2 transmitting the copied current Icopy from the load-driving circuit section 20 to the MOS transistor Q1 or blocking the copied current Icopy (and to turn on the transistor Q3) while the converter is being activated (powered on).

Figure 4A:
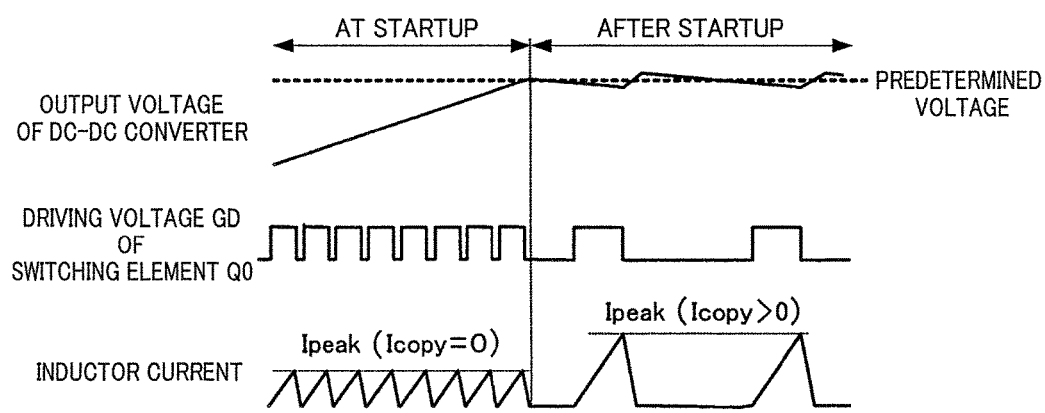
FIG. 4A is a timing chart indicating a variation in potential at the time of startup and during the normal operation in the DC-DC converter according to the embodiment.
Figure 4B:
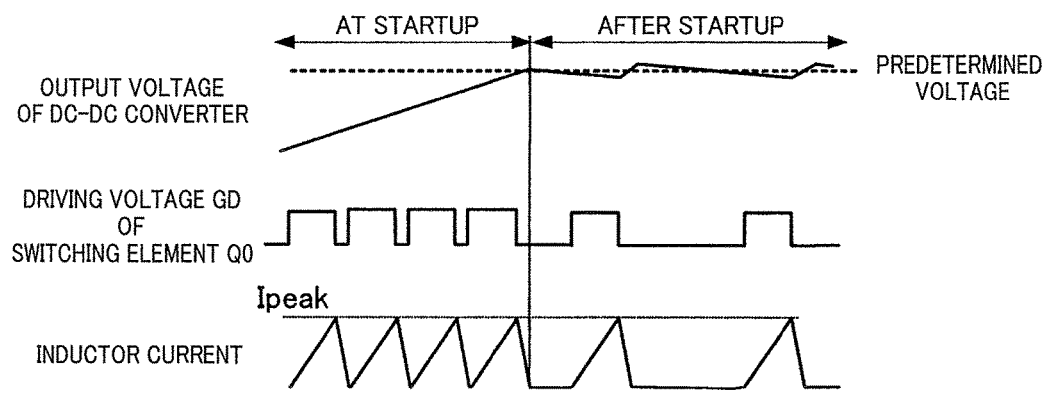
FIG. 4B is a timing chart indicating a variation in potential at the time of startup and during the normal operation in the traditional DC-DC converter.

In this manner, the copied current (Icopy) from the output circuit section of the amplifier is blocked by the transistor Q2 at the time of startup, and the peak current Ipeak through the inductor L1 is thereby kept low, as illustrated in FIG. 4A. As a result, an increase in power at the time of startup can be prevented, and the boosted power supply has a reduced current load, which prevents the scale of the power supply to be increased.

Control signals EN, /EN turning on or off the transmission MOS transistors Q2 and Q3 may be generated in response to a detected signal from a circuit for detection of an increase in power voltage (the voltage of the external terminal VBST) in an IC chip or may be generated based on external control signals, such as start signal and enable signal, from the outside of a chip on an IC configured to receive such signals.

A detailed configuration of the output circuit sections 23A and 23B in the load-driving circuit section 20 according to the embodiment will now be described in reference to FIGS. 2A and 2B.

It should be noted that the output circuit sections 23A and 23B in the load-driving circuit section 20 have an identical configuration and that the output circuit section 23B operates in the same manner as the output circuit section 23A except that the signal to the output circuit section 23A has a phase reversed to that of the signal from the differential amplifier 22A to the output circuit section 23A. Thus, only the configuration and operation of the output circuit section 23A will be explained without redundant description on the output circuit section 23B.

Figure 2A:
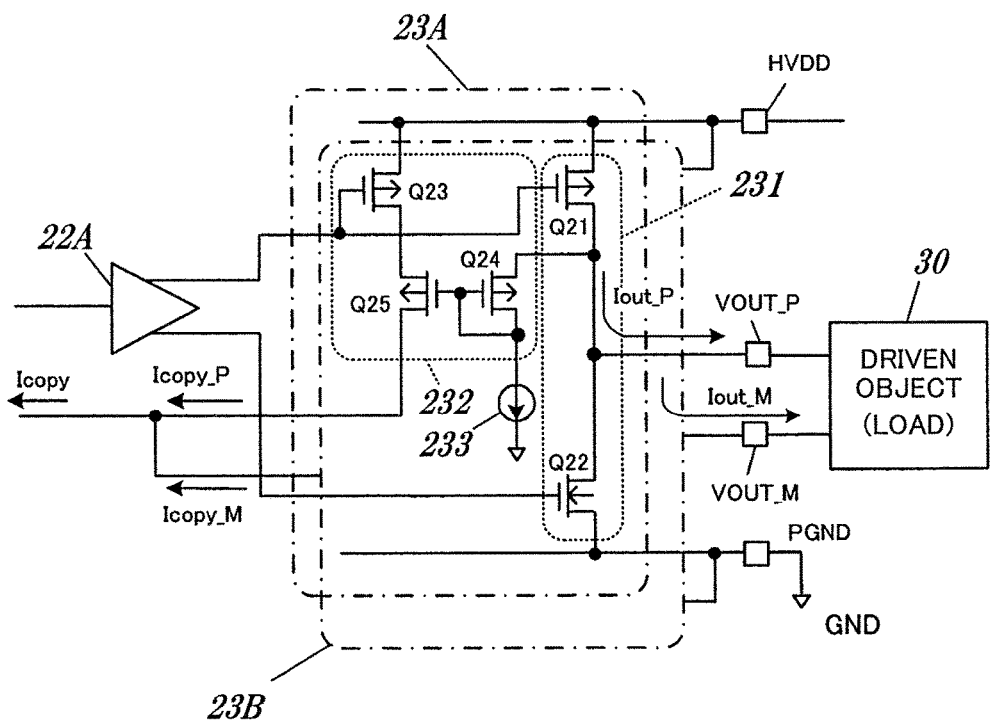
FIG. 2A is a diagram illustrating a specific example of a load-driving circuit section in the load-driving semiconductor integrated circuit of FIG. 1.

As illustrated in FIG. 2A, the load-driving circuit section 20 includes:

an output stage 231 including a P-channel MOS transistor Q21 and a N-channel MOS transistor Q22 that are connected in series between a terminal HVDD supplying a voltage from the terminal VBST (in FIG. 1) and a grounding potential terminal PGND and that each have a gate terminal supplying a positive or negative output signal from the differential amplifier 22A; and an output-current copier 232 generating a current proportionally reduced from a drain current passing through the MOS transistor Q21.

The output-current copier 232 includes:

a MOS transistor Q23 of the same P-channel type as the MOS transistor Q21 and having a smaller size than the MOS transistor Q21;

a pair of P-channel MOS transistors Q24 and Q25 connected in series to the MOS transistors Q21 and Q23, respectively, and defining a cascode stage; and a constant-current source 233 connected in series to the MOS transistor Q24.

The same signal is applied to the gate terminals of the MOS transistors Q23 and Q21, and thus they define a current mirror circuit. A drain current proportionally reduced from the drain current flowing through the MOS transistor Q21 passes through the MOS transistor Q23. In the MOS transistor Q24, the gate terminal is coupled with the drain terminal. The gate terminal of the transistor Q25 is coupled with that of the transistor Q24. Thus, the MOS transistors Q21, Q23, Q24, and Q25 define a cascode current mirror circuit.

In the load-driving circuit section 20 according to this embodiment, a high voltage is applied to the terminal HVDD. Thus, the current mirror circuit consisting only of the MOS transistors Q21 and Q23 may generate a high voltage Vds between the sources and drains of the transistors Q21 and Q23, the channel-length modulation effect may vary the effective channel length, and the drain current might vary in response to the voltages through the terminals VOUT_P and VOUT_M, which may make it difficult to produce a copied current precisely proportional to the output current. In contrast, as described above, the output-current copier 232 defining a cascode current mirror circuit and generating a current proportionally reduced from the drain current passing through the MOS transistor Q21 can achieve the copied currents Icopy_P and Icopy_M substantially proportional to the output currents Iout_P and Iout_M without an impact of the channel-length modulation effect.

Figure 2B:
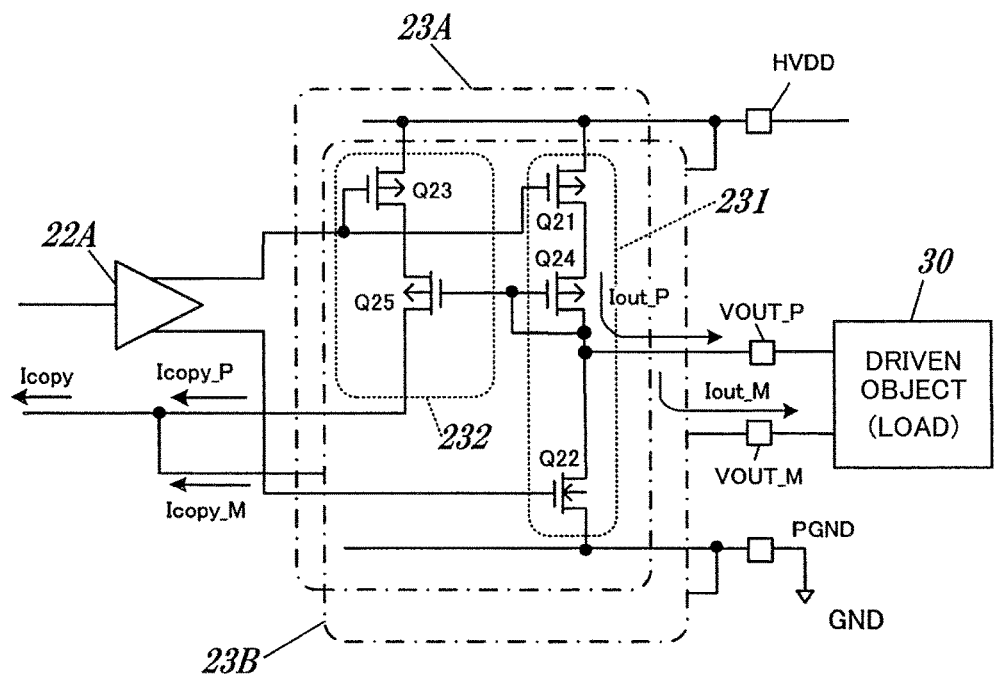
FIG. 2B is a diagram illustrating another specific example of the load-driving circuit section in the load-driving semiconductor integrated circuit of FIG. 1.

A general approach of defining the cascode current mirror circuit is, for example, to connect the MOS transistor Q24 in the cascode stage in series to the P-channel MOS transistor Q21 and the N-channel MOS transistor Q22 in the output stage, as illustrated in FIG. 2B. In such a configuration, if a voltage not less than a threshold is not applied between the gate and the source of the MOS transistor Q24, no current passes through the transistor, narrowing the range of the output voltage applied to the load 30.

In contrast, in accordance with this embodiment, the MOS transistor Q24 in the cascode stage is connected in parallel to the MOS transistor Q22 close to the grounding potential in the output stage, and the constant-current source 233 is connected to the drain terminal of the transistor Q24, keeping the range of the applied output voltage. In this configuration, the output current Iout_P decreases by the current passing through the constant-current source 233, and precision of the current copy ratio is reduced. In the circuit according to this embodiment, however, the current Iout_P from the output circuit section 23A in the load-driving circuit section 20 is on the order of 10 mA whereas the current from the constant-current source 233 can remain in a negligible level of, for example, 10 µA. Thus, the output current is scarcely impacted and the current copy ratio is barely decreased.

In the cascode current mirror circuit of FIG. 2B, the current through the MOS transistor Q21 directly passes through the MOS transistor Q24 in the cascode stage. Thus, the transistor Q24 needs to have a device size close to that of the transistor Q21. In contrast, in the case of the current mirror circuit illustrated in FIG. 2A, the size ratio of the MOS transistors Q25 and Q24 in the cascode stage can be determined to be, for example, 1:1 even if the size ratio of MOS transistors Q23 and Q21 in the current mirror circuit is 1:n. The value of n can be determined in relation to the ratio of the output current Iout_P (10 mA) to the current (10 µA) from the constant-current source 233. Thus, the value of n is quite large. In spite of the circuit in FIG. 2A including more devices than those in FIG. 2B due to the constant-current source 233, the transistor Q24 can have a considerably reduced size. Advantageously, the circuit illustrated in FIG. 2A may have a remarkably reduced total footprint accordingly.

Figure 6:
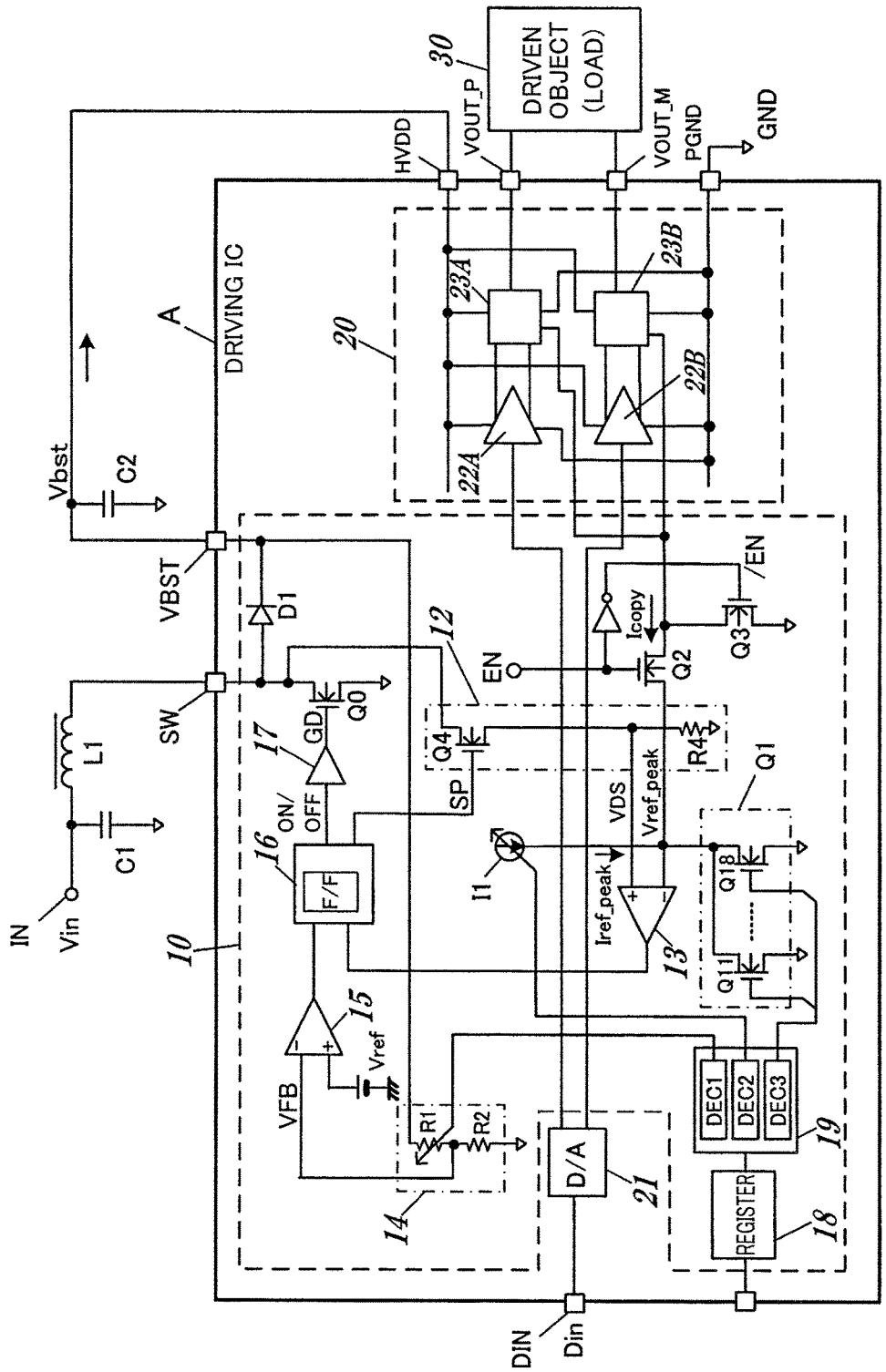
FIG. 6 is a diagram illustrating a modification of the DC-DC converter and the load-driving semiconductor integrated circuit according to the embodiment of FIG. 1.

A modification of the DC-DC converter according to this embodiment will now be described in reference to FIG. 6.

In the present modification, the divider circuit 14, which divides the output voltage from the terminal VBST to generate the feedback voltage VFB, includes the resistor R1 that works as a variable-resistance circuit varying the resistance value. Thus, the output voltage Vbst can be varied. The constant-current source I1 receiving the reference current Iref_peak serves as a variable-current source. A transistor (the transistor Q1 of FIG. 1), which combines the copied current Icopy with the reference current Iref_peak to generate a reference voltage, includes multiple (for example, eight) MOS transistors Q11 to Q18 connected in parallel. In response to the output voltage varied by the resistance-variable circuit (R1), the value of the reference current Iref_peak from the constant-current source I1 and the number of transistors Q11 to Q18 to be switched on are variable.

The variations in the value of the reference current Iref_peak and the number of transistors Q11 to Q18 to be switched on indicate a change in the size (gate width) of the MOS transistor Q1 in FIG. 1 and thus a change in the reference voltage Vref_peak defining the peak-current value.

If the boosted voltage is varied, the optimal peak-current value allowing the switching frequency to be in a preferred range (20 kHz to 500 kHz) is also varied. If only the output voltage is varied at a constant reference voltage Vref_peak, the switching frequency may be outside of the preferred range (20 kHz to 500 kHz). In contrast, in accordance with the present modification, the reference voltage Vref_peak is varied in response to the output voltage. The peak-current value can be thereby optimized, which can prevent a fluctuation in load from causing the switching frequency to be out of the preferred range.

In the present modification, the IC chip is provided with a decoding circuit 19 including decoders DEC1, DEC2, and DEC3 that decode a register 18 and a predetermined value for the register 18 (a binary code) to generate respective signals varying the resistance value of the resistance-variable circuit included in the divider circuit 14, the value of the reference current Iref_peak, and the number of the transistors Q11 to Q18 to be switched on.

Although the present invention made by the inventors has been described in detail with reference to the embodiment, the invention may include any other embodiment. For example, in the embodiment, the copied currents proportional to the currents to the output circuit sections 23A and 23B in the load-driving circuit section 20 are generated, supplied to the switching control circuit section 10, and combined with the reference current. When it is detected using the combined current that the current through the inductor reaches a predetermined value, the switching transistor Q0 is switched off. Alternatively, copied currents may be generated that are proportional not only to the currents to the output circuit sections 23A and 23B, but also to the currents combined with the operating currents of the differential amplifiers 22A and 22B and may be supplied to the switching control circuit section 10. Such control procedures may be performed if the operating currents of the differential amplifiers 22A and 22B increase or decrease in response to the level of the output current or the output voltage. Thus, the peak-current can be precisely controlled, and the operating frequency can be more properly stabilized.

The circuit according to this embodiment includes MOS transistors. Alternatively, the circuit may include bipolar transistors instead of MOS transistors in the present invention. In the embodiment, a load-driving IC provided with a load-driving circuit having differential output circuit sections is described. Alternatively, a load-driving IC provided with a load-driving circuit having single-ended output circuit sections may be employed.

In the embodiment, a load-driving circuit is employed. Alternatively, a low drop-out (LDO) regulator may be employed instead of the load-driving circuit in the invention.

INDUSTRIAL APPLICABILITY

Although an example application of the load-driving circuit capable of driving a piezoelectric device functioning as an actuator for an automobile electronic device is described in the embodiment, the present invention can be employed in load-driving circuits for driving of any other component, for example, a microelectromechanical system (MEMS).

REFERENCE SIGNS LIST

A load-driving semiconductor integrated circuit (load-driving ic)
10 switching control circuit section
11 reference-voltage generating circuit module
12 current detection circuit
13 first comparator
14 divider circuit
15 second comparator
16 logic circuit
17 gate driver
20 load-driving circuit section
22a, 22b differential amplifier
23a, 23b output circuit section
231 output stage
232 output-current copier (copied-current generating circuit)
30 load
l1 inductor (coil)
q0 inductor-driving switching transistor (switching element)

The invention claimed is:

1. A DC-DC converter that turns on or off a switching element which allows a current to pass through an inductor and rectifies the current through the inductor to convert an input direct current voltage supplied from a direct current power unit into a direct current voltage at a different potential and output the converted direct current voltage, the converter comprising:

a switching control circuit which performs peak-current control procedures comprising turning on the switching element when the converted direct current voltage drops to a predetermined potential and turning off the switching element when the current through the inductor reaches a predetermined value;

a load-driving circuit which receives the converted direct current voltage and outputs an output current to a load; and a copied-current generating circuit which generates a copied current proportional to the output current output from the load-driving circuit, wherein the load-driving circuit comprises a differential amplifier which amplifies an input signal and an output circuit which generates and outputs the output current corresponding to the amplified output signal from the differential amplifier, and wherein the switching control circuit turns off the switching element when the switching control circuit detects that the current through the inductor reaches a predetermined value corresponding to a combined current of the copied current generated at the copied-current generating circuit and a predetermined reference current.

2. The DC-DC converter according to claim 1, wherein:
the load-driving circuit comprises a plurality of differential amplifiers which amplify input signals and a plurality of output circuits which generate and output currents in response to output signals from the differential amplifiers,
the copied-current generating circuit generates the copied current proportional to a combined current of currents from the output circuits and supplies the copied current to the switching control circuit, and
the switching control circuit turns off the switching element when the switching control circuit detects that the current through the inductor reaches the predetermined value corresponding to the combined current of the copied current from the copied-current generating circuit and the predetermined reference current.

3. A load-driving semiconductor integrated circuit comprising a switching control circuit and a load-driving circuit on a single semiconductor substrate, the switching control circuit turning on or off a switching element which allows a current to pass through an inductor and rectify the current through the inductor to convert an input direct current voltage supplied from a direct current power unit into a direct current voltage at a different potential and output the converted direct current voltage, and the load-driving circuit outputting an output current to a load, wherein:
the load-driving circuit comprises a differential amplifier which amplifies an input signal, an output circuit which generates and outputs the output current corresponding to the amplified output signal from the differential amplifier, and a copied-current generating circuit which generates a copied current proportional to the output current output from the output circuit, the load-driving circuit receiving the converted direct current voltage and outputting the output current to the load, and supplying the copied current to the switching control circuit,
the switching control circuit being configured to:
perform peak-current control procedures comprising turning on the switching element and then turning off the switching element when the current through the inductor reaches a predetermined value,
turn off the switching element when the switching control circuit detects that the current through the inductor reaches a predetermined value corresponding to a combined current of the copied current generated at the copied-current generating circuit and a predetermined reference current, and
turn on the switching element when the converted direct current voltage drops to a predetermined potential.

4. A DC-DC converter that turns on or off a switching element which allows a current to pass through an inductor and rectifies the current through the inductor to convert an input direct current voltage supplied from a direct current power unit into a direct current voltage at a different potential and output the converted direct current voltage, the converter comprising:
a switching control circuit which performs peak-current control procedures comprising turning on the switching element when the converted direct current voltage drops to a predetermined potential and turning off the switching element when the current through the inductor reaches a predetermined value; and
a copied-current generating circuit which generates a copied current proportional to an output current,
wherein the switching element is a first field effect transistor, and the switching control circuit comprises a current detection circuit,
wherein the current detection circuit comprises a second field effect transistor having a same conductivity type as the switching element, a combined current of the copied current generated at the copied-current generating circuit and a reference current passing through the second field effect transistor, and wherein the current detection circuit compares a reference voltage converted from the current at the second field effect transistor with a drain voltage of the switching element, and generates a signal that provides a timing for turning off the switching element when the drain voltage reaches the reference voltage, and
wherein the switching control circuit turns off the switching element when the switching control circuit detects that the current through the inductor reaches a predetermined value corresponding to the combined current.

5. The DC-DC converter according to claim 4, further comprising:
a load-driving circuit which receives the converted direct current voltage and outputs the output current to a load,
wherein the copied-current generating circuit generates the copied current proportional to the current output from the load-driving circuit.

6. The DC-DC converter according to claim 5, further comprising a transmission switch capable of delivering or blocking the drain voltage of the switching element to the current detection circuit, the transmission switch being switched on or off in response to switching on or off of the switching element.

7. The DC-DC converter according to claim 5, wherein:
the switching control circuit further comprises a divider circuit which divides an output voltage to generate a feedback voltage and a circuit which generates a signal to provide a timing for turning on the switching element when the feedback voltage reaches a predetermined potential,
the divider circuit varies a voltage division ratio and determines the output voltage in response to the voltage division ratio of the divider circuit,
the current detection circuit comprises a plurality of second field effect transistors provided in parallel, the second field effect transistors having a same conductivity type as the switching element, and the combined current of the copied current and the reference current passing through the second field effect transistors, and
the field effect transistors selectively operate in response to the voltage division ratio of the divider circuit such that the drain voltage of the switching element varies when the switching element is switched off.

8. The DC-DC converter according to claim 5, further comprising:
a load-driving circuit which receives the converted direct current voltage and outputs the output current to a load,
wherein the load-driving circuit comprises a differential amplifier which amplifies an input signal and an output circuit which generates and outputs the output current corresponding to an output from the differential amplifier,
wherein the output circuit comprises a first transistor which outputs a current corresponding to the amplified signal from the differential amplifier, and wherein the copied-current generating circuit is a current mirror circuit comprising a second transistor provided in parallel to the first transistor, a same signal being applied to control terminals of the first and second transistors such that a current proportional to the signal passes through the second transistor, the current passing through the second transistor being supplied to the current detection circuit as the copied current.

9. The DC-DC converter according to claim 8, wherein:

the output circuit comprises a third transistor connected in series to the first transistor between a power voltage terminal and a grounding point, a connection node of the first transistor and the third transistor being connected to an output terminal of the load, and the current mirror circuit is of a cascode type comprising:
  a fourth transistor and a constant-current source provided in series between the connection node and the grounding point; and
  a fifth transistor connected in series to the second transistor, a same signal being applied to the control terminals of the fourth and fifth transistors, and the fourth transistor being connected to a diode.

10. The DC-DC converter according to claim 5, further comprising a second transmission switch that supplies the copied current generated at the copied-current generating circuit to the current detection circuit or blocks the copied current, the second transmission switch being switched off at a startup time and being switched on in a normal operation after the startup.

* * * * *